(12) United States Patent
Zhang et al.

(10) Patent No.: US 11,194,113 B2
(45) Date of Patent: Dec. 7, 2021

(54) OPTICAL SPLITTING APPARATUS

(71) Applicant: Huawei Technologies Co., Ltd., Shenzhen (CN)

(72) Inventors: Jinjin Zhang, Wuhan (CN); Xiaoqin Jia, Mexico City (MX)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/706,406

(22) Filed: Dec. 6, 2019

(65) Prior Publication Data
US 2020/0209479 A1    Jul. 2, 2020

Related U.S. Application Data

(63) Continuation of application No. PCT/CN2018/125318, filed on Dec. 29, 2018.

(51) Int. Cl.
*G02B 6/28* (2006.01)
*G02B 6/44* (2006.01)

(52) U.S. Cl.
CPC ......... *G02B 6/4471* (2013.01); *G02B 6/2804* (2013.01); *G02B 6/4452* (2013.01); *G02B 6/4473* (2013.01); *G02B 6/2808* (2013.01)

(58) Field of Classification Search
None
See application file for complete search history.

(56) References Cited

U.S. PATENT DOCUMENTS

| 9,544,049 B2 | 1/2017 | Fink et al. | |
|---|---|---|---|
| 2002/0110315 A1 | 8/2002 | Redmond | |
| 2006/0269208 A1* | 11/2006 | Allen | G02B 6/3878 385/135 |
| 2009/0208177 A1* | 8/2009 | Smith | H04B 10/271 385/135 |

(Continued)

FOREIGN PATENT DOCUMENTS

| CN | 1469558 | 1/2004 |
|---|---|---|
| CN | 202210164 U | 5/2012 |

(Continued)

OTHER PUBLICATIONS

Written opinion for EP 18921286.3, dated Jul. 14, 2020. (Year: 2020).*

(Continued)

*Primary Examiner* — Michael Stahl
(74) *Attorney, Agent, or Firm* — Slater Matsil, LLP (57) ABSTRACT

An optical splitting apparatus includes an enclosure, an even optical splitter and an uneven optical splitter that are disposed in the enclosure. A light inlet and a plurality of light outlets are disposed on the enclosure, and fiber adapters are disposed on the light outlets. The light inlet, the even optical splitter, the uneven optical splitter, and the light outlets are connected, so that optical paths are formed between the light inlet and the light outlets by using the even optical splitter and the uneven optical splitter. The light inlet is connected to at least one of a light input end of the even optical splitter and a light input end of the uneven optical splitter, and the fiber adapter on the light outlet is connected to at least one of a light output end of the even optical splitter and a light output end of the uneven optical splitter.

19 Claims, 8 Drawing Sheets

(56) References Cited

U.S. PATENT DOCUMENTS

| | | | |
|---|---|---|---|
| 2009/0257727 A1* | 10/2009 | Laurisch | G02B 6/4453 385/135 |
| 2010/0129030 A1 | 5/2010 | Giraud et al. | |
| 2013/0216187 A1* | 8/2013 | Dowling | G02B 6/262 385/71 |
| 2014/0270766 A1* | 9/2014 | Gross | H04Q 11/0005 398/48 |
| 2015/0003838 A1 | 1/2015 | Gottwald et al. | |
| 2015/0263810 A1* | 9/2015 | Yao | H04B 10/272 398/58 |
| 2016/0004026 A1 | 1/2016 | Kegerise et al. | |
| 2016/0204868 A1 | 7/2016 | Celo et al. | |
| 2016/0308620 A1 | 10/2016 | Liu et al. | |
| 2017/0176701 A1 | 6/2017 | Claessens et al. | |
| 2020/0196035 A1* | 6/2020 | Rousseaux | H04B 10/40 |
| 2020/0284980 A1* | 9/2020 | Qi | G02B 6/125 |

FOREIGN PATENT DOCUMENTS

| | | |
|---|---|---|
| CN | 102983915 A | 3/2013 |
| CN | 103166712 A | 6/2013 |
| CN | 103262442 A | 8/2013 |
| CN | 103312556 A | 9/2013 |
| CN | 104753603 A | 7/2015 |
| CN | 107210818 A | 9/2017 |
| EP | 1233553 A2 * | 8/2002 |
| JP | H05136745 A | 6/1993 |
| JP | 2000121857 A | 4/2000 |
| JP | 2010122529 A | 6/2010 |
| JP | 2010122531 A | 6/2010 |
| JP | 2011166392 A | 8/2011 |
| JP | 5243202 B2 | 7/2013 |
| JP | 2014-174394 A * | 9/2014 |
| JP | 2015535413 A | 12/2015 |
| KR | 20100071468 A | 6/2010 |
| RU | 2018161 C1 | 8/1994 |
| RU | 2204211 C1 | 5/2003 |
| WO | 2013025979 A2 | 2/2013 |
| WO | 2013063543 A1 | 5/2013 |
| WO | 2014096134 A1 | 6/2014 |
| WO | 2018157285 A1 | 9/2018 |
| WO | WO 2020/018657 A1 * | 1/2020 |
| WO | WO 2020/045185 A1 * | 3/2020 |
| WO | WO 2020/073109 A1 * | 4/2020 |
| WO | WO 2020/107085 A1 * | 6/2020 |
| WO | WO 2020/133342 A1 * | 7/2020 |

OTHER PUBLICATIONS

Miao, J. et al., "Modern Communication Network 3rd Edition", May 31, 2013, 14 pages.

* cited by examiner

OPTICAL SPLITTING APPARATUS

CROSS-REFERENCE TO RELATED APPLICATIONS

This application is a continuation of International Application No. PCT/CN2018/125318, filed on Dec. 29, 2018, the disclosure of which is hereby incorporated by reference in its entirety.

TECHNICAL FIELD

This application relates to the field of optical communications technologies, and in particular, to an optical splitting apparatus.

BACKGROUND

An optical distribution network (ODN) provides a physical path for optical transmission between an optical line terminal (OLT) and an optical network terminal (ONT). In the ODN, optical splitting usually needs to be performed in an optical fiber in an optical cable, to cover more users.

Figure 1:
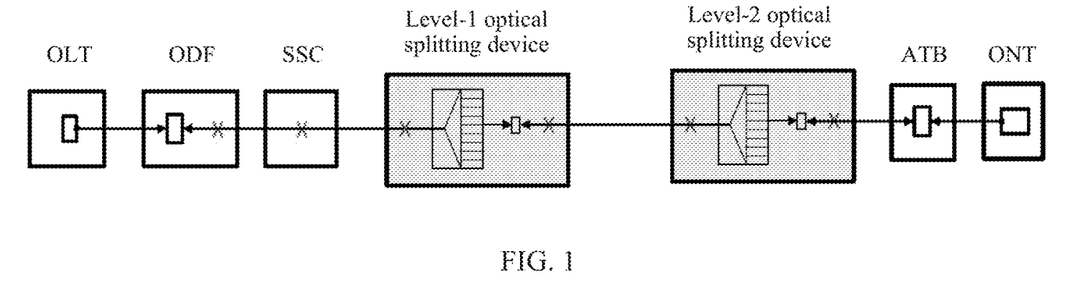
FIG. 1 is a schematic diagram of a conventional optical fiber link.

Conventional optical splitting solutions are mostly even optical splitting solutions. FIG. 1 is a schematic diagram of a conventional optical fiber link. An optical signal output from an OLT passes through an optical distribution frame (ODF), a splitting and splicing closure (SSC), a level-1 optical splitting device, a level-2 optical splitting device, and an access terminal box (ATB) in sequence, and then arrives at an ONT. The level-1 optical splitting device in FIG. 1 performs, for example, 1:8 optical splitting. The level-1 optical splitting device includes eight light output ends. FIG. 1 illustrates only one of the light output ends, and the other light output ends are omitted in FIG. 1. The same applies to the level-2 optical splitting device. FIG. 1 illustrates only one of the light output ends, and the other light output ends are omitted.

In a conventional optical splitting solution, to enable optical fibers to cover a longer distance, the optical fibers usually need to be divided, spliced, connected, and the like. In the optical splitting devices shown in FIG. 1, optical fibers usually need to be spliced to implement connection of the optical fibers. This not only results in a long implementation period, but also requires a relatively high implementation skill. Quality of the splicing depends on a skill of an operator, and consequently, it is relatively difficult to implement and labor costs are high.

SUMMARY

This application provides an optical splitting apparatus, to improve efficiency in implementing an optical splitting device, lower an implementation difficulty, and reduce labor costs.

A first aspect of this application provides an optical splitting apparatus, applied to an ODN field. The optical splitting apparatus in this application may be, for example, an optical splitting device such as a splitting and splicing closure, a fiber access terminal (FAT), or an optical cable access terminal. The optical splitting apparatus includes an enclosure and an even optical splitter and an uneven optical splitter that are disposed in the enclosure, or the optical splitting apparatus includes an enclosure and an uneven optical splitter that is disposed in the enclosure. A light inlet and a plurality of light outlets are disposed on the enclosure, fiber adapters are disposed on the light outlets, and a fiber adapter may also be disposed on the light inlet. The light inlet, the even optical splitter, the uneven optical splitter, and the light outlets are connected so that optical paths are formed between the light inlet and the light outlets by using the even optical splitter and the uneven optical splitter; or the light inlet, the uneven optical splitter, and the light outlets are connected, so that optical paths are formed between the light inlet and the light outlets by using the uneven optical splitter. The light inlet is connected to at least one of a light input end of the even optical splitter and a light input end of the uneven optical splitter, and the fiber adapter on the light outlet is connected to at least one of a light output end of the even optical splitter and a light output end of the uneven optical splitter. An end that is of the fiber adapter and that is located outside the enclosure is detachably fastened and connected to an external optical fiber connector. Fiber adapters are disposed on the light inlet and the light outlets, and a fastconnect product may be used as a fiber adapter. During installation, installation can be completed by directly inserting an optical fiber connector on a pre-made optical cable into a fiber adapter. In this way, an optical splitting box is installed without splicing, and plug-and-play is implemented for all components, thereby effectively lowering an implementation difficulty, and improving implementation efficiency. The fiber adapter and the uneven optical splitter are combined, so that the optical splitting box is installed by using the pre-made optical cable without splicing, and plug-and-play is implemented for all the components. In addition, output optical power of each light outlet can be configured flexibly based on a user distribution status. For example, a light outlet having relatively low output optical power may correspondingly cover a relatively nearby user, and an optical cable coming out of a light outlet having relatively high output optical power may be further connected to a next node, to cover more users at a longer distance. The uneven optical splitter is used flexibly. Therefore, a quantity of to-be-customized types of pre-made optical cables can be effectively reduced, and an optical signal can be properly allocated, thereby reducing a line loss.

In some possible designs, an end that is of the fiber adapter and that is located inside the enclosure is detachably fastened and connected to an internal optical fiber connector. The internal optical fiber connector may be an optical fiber connector of an optical splitter (including the even optical splitter and the uneven optical splitter), and includes an optical fiber connector of a light input end and an optical fiber connector of a light output end. In this way, installation efficiency is further improved, and the optical splitter can be rapidly connected to the fiber adapter on the light inlet and the fiber adapter on the light outlet.

In some possible designs, at least one even optical splitter is connected between the light output end of the uneven optical splitter and the light outlets. The light output end connected to the even optical splitter may be a light output end having relatively low output optical power in light output ends of the uneven optical splitter. This can not only ensure optical fiber coverage of users nearby, but also make an optical signal of most optical power continue to be transmitted to a next node, so that more optical fiber users at a longer distance are covered.

In some possible designs, at least one even optical splitter is connected between the light inlet and the light input end of the uneven optical splitter. In this way, an optical signal entering the enclosure is first divided evenly by the even optical splitter and then an optical signal obtained after the even division is divided unevenly by the uneven optical splitter. Then some optical signals (for example, an optical signal, having relatively high output optical power and output by the uneven optical splitter) continue to be transmitted to a longer distance and allocated to more users for use, and some optical signals (for example, an optical signal, having relatively low output optical power and output by the uneven optical splitter) are allocated to users nearby to meet use requirements of a relatively large quantity of users nearby.

In some possible designs, at least one light outlet is connected to a light output end of at least one uneven optical splitter. In this way, an optical signal output by the uneven optical splitter can be transmitted to a longer distance and therefore be allocated to more users at a longer distance. Specifically, some light output ends of the at least one uneven optical splitter are connected to the light outlets, and the light output ends of the uneven optical splitter that are connected to the light outlet are light output ends having relatively high output optical power in light output ends of the uneven optical splitter. In this way, after an optical signal passes through the uneven optical splitter, an optical signal of most power is transmitted to a next node through the light outlet, so that the optical signal of most power remains in a trunk path and can be transmitted to a longer distance, and the optical signal is allocated to more users at a longer distance. An optical signal of a small portion of power is allocated to a relatively nearby user for use after passing through the even optical splitter. Alternatively, all light output ends of the at least one uneven optical splitter are connected to light outlets in a one-to-one correspondence. In this way, optical signals are transmitted to different nodes after passing through the light output ends of the uneven optical splitter. An optical signal output by a light output end having relatively high output optical power may be transmitted to a node covering a relatively large quantity of users, and an optical signal output by a light output end having relatively low output optical power may be transmitted to a node covering a relatively small quantity of users.

In some possible designs, at least one uneven optical splitter is connected between the light output end of the even optical splitter and the light outlets. In this way, an optical signal entering the enclosure is divided evenly by the even optical splitter and then an optical signal obtained after the even division is divided unevenly by the uneven optical splitter. Then some optical signals (for example, an optical signal, having relatively high output optical power and output by the uneven optical splitter) continue to be transmitted to a longer distance and allocated to more users for use, and some optical signals (for example, an optical signal, having relatively low output optical power and output by the uneven optical splitter) are allocated to users nearby to meet use requirements of a relatively large quantity of users nearby.

In some possible designs, at least one uneven optical splitter is connected between the light inlet and the light input end of the even optical splitter. In this way, an optical signal entering the enclosure is divided unevenly by the uneven optical splitter and then an optical signal obtained after the uneven division is divided evenly by the even optical splitter (for example, the even optical splitter may be connected to a light output end, of the uneven optical splitter 3, having relatively low output optical power), to meet a use requirement of a user nearby. A light output end, of the even optical splitter, having relatively high output optical power may be connected to a light outlet, so that an optical signal continues to be transmitted to a longer distance and allocated to more users for use.

DETAILED DESCRIPTION OF ILLUSTRATIVE EMBODIMENTS

In the specification, claims, and accompanying drawings of this application, the terms "first", "second", and the like are intended to distinguish between similar objects but are not necessarily used to describe a specific order. It should be understood that data termed in such a way is interchangeable in proper circumstances so that the embodiments described herein can be implemented in other orders than the order in content illustrated or described herein. In addition, the terms "include" and "have" and any other variants thereof are intended to cover a non-exclusive inclusion. For example, a product or a device including a series of structures is not necessarily limited to the clearly listed structures but may include other structures that are not clearly listed or that are inherent to the product or the device. Examples of structures appearing in this application are merely examples for description, and there may be other alternative structures during implementation in actual application. For example, a plurality of parts may be combined or integrated into another structure, or some structural features may be ignored or not performed. In addition, for displayed or discussed mutual couplings or direct couplings, some or all of the structures may be selected based on an actual requirement to achieve the objectives of the solutions in the embodiment of the present invention.

The embodiments of the present invention provide an optical splitting apparatus, applied to an optical communications field, for example, an ODN field. The optical splitting apparatus in this application may be, for example, an optical splitting device such as a splitting and splicing closure, a fiber access terminal (FAT), or an optical cable access terminal. A specific name is not limited in this application.

Figure 2:
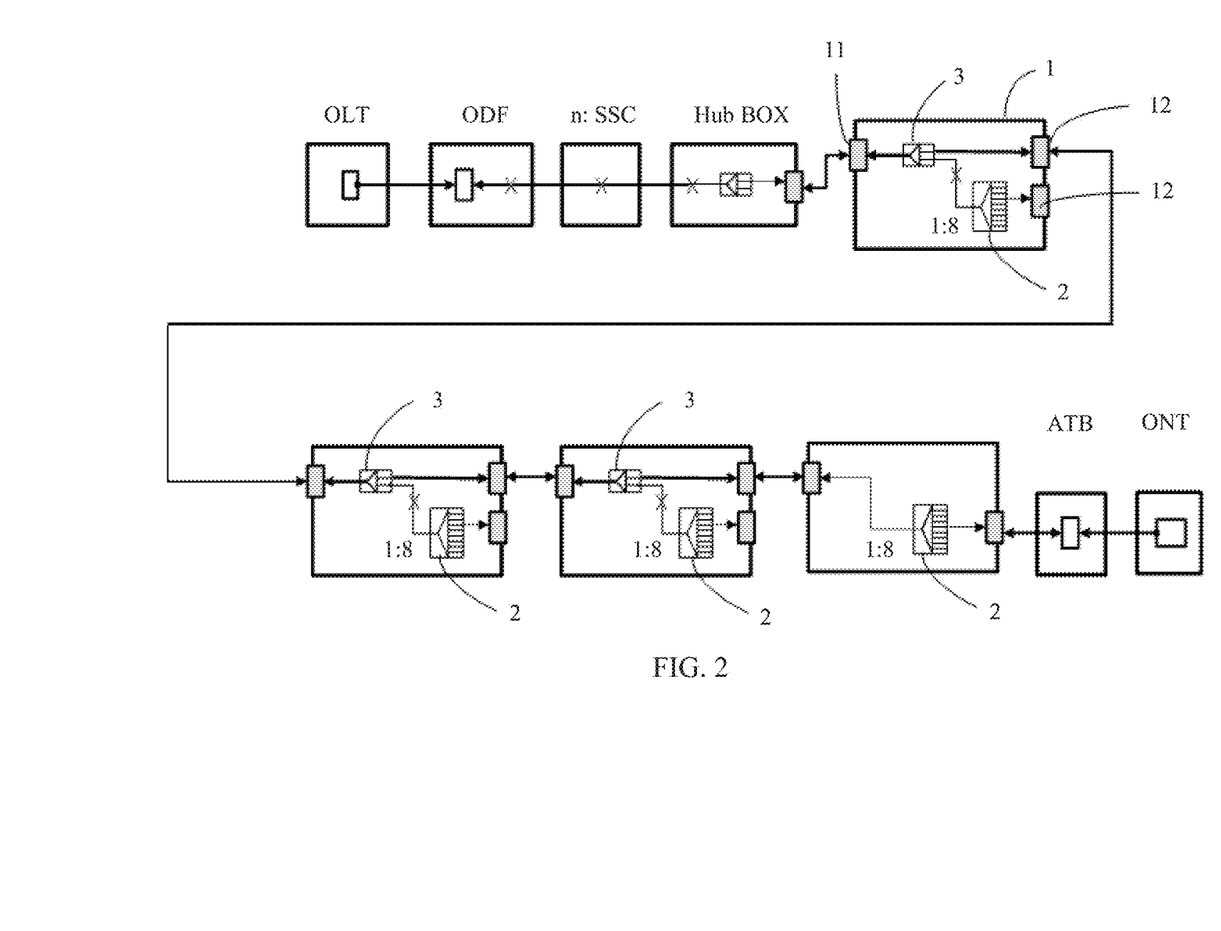
FIG. 2 is a schematic diagram of an optical fiber link according to an embodiment of the present invention.
Figure 3:
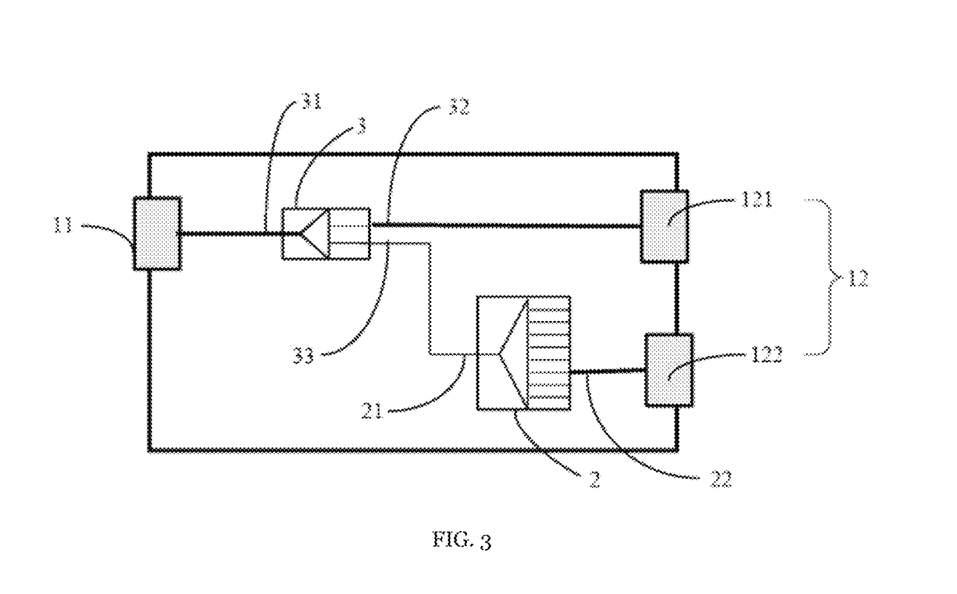
FIG. 3 is a schematic structural diagram of an embodiment of an optical splitting apparatus according to the embodiments of the present invention.
Figure 4:
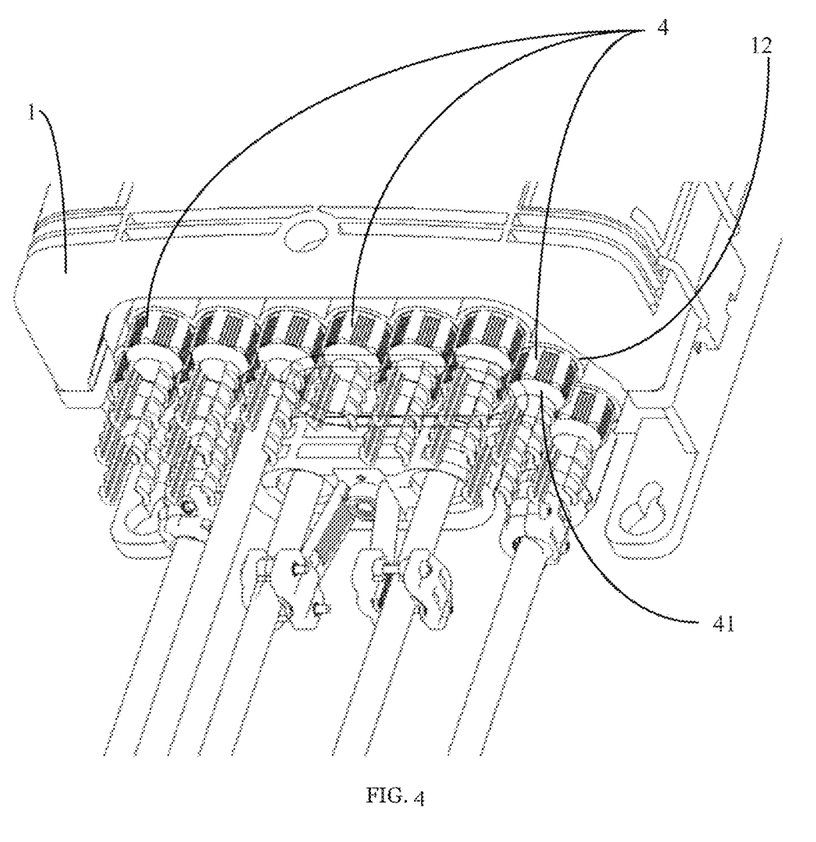
FIG. 4 is a schematic diagram of a partial structure of an embodiment of an optical splitting apparatus according to the embodiments of the present invention.

In an embodiment, refer to FIG. 2 to FIG. 4. FIG. 2 is a schematic diagram of an optical fiber link according to an embodiment of the present invention. Three optical splitting apparatuses in the embodiments of the present invention are configured for the link. FIG. 3 is a schematic structural diagram of an embodiment of the optical splitting apparatus according to the embodiments of the present invention, and FIG. 4 is a schematic diagram of a partial structure of an embodiment of the optical splitting apparatus according to the embodiments of the present invention.

The optical splitting apparatus includes an enclosure 1. A light inlet 11 and a plurality of light outlets 12 are disposed on the enclosure 1.

A fiber adapter 4 may be disposed on each of the plurality of light outlets 12, or fiber adapters 4 may be disposed on some of the light outlets 12. An example in which one fiber adapter 4 is disposed on each light outlet 12 is used in the following embodiments.

There may be one or at least two light inlets 11 on each enclosure 1. An example in which there is one light inlet 11 on each enclosure 1 is used in the following embodiments. A fiber adapter 4 may also be disposed on the light inlet 11.

Figure 9:
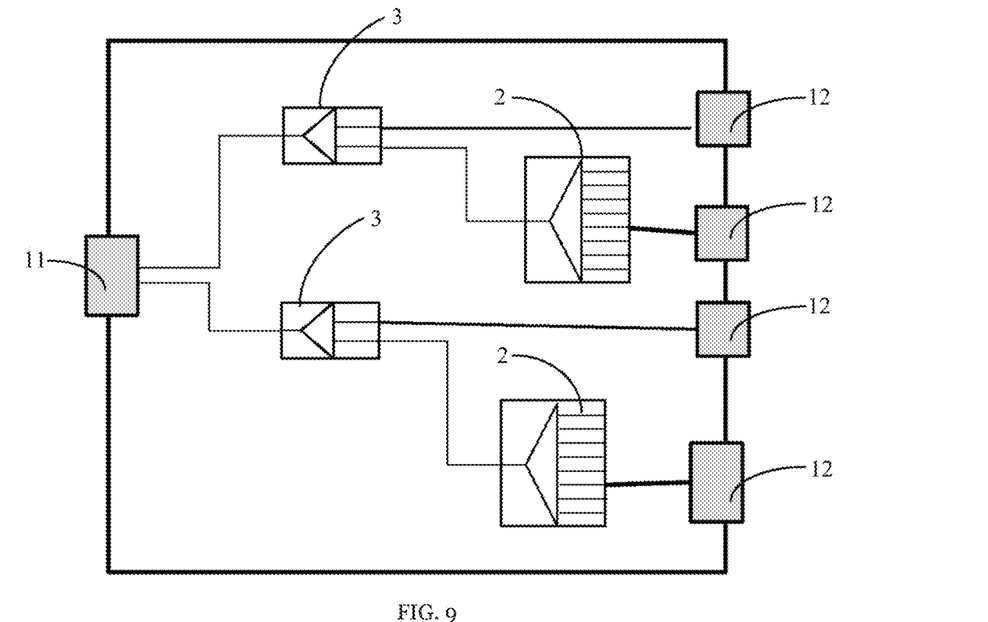
FIG. 9 is a schematic structural diagram of another embodiment of an optical splitting apparatus according to the embodiments of the present invention.

The fiber adapter 4 may have a single core, in other words, each fiber adapter 4 allows one optical fiber to pass through; and correspondingly, an optical fiber connector connected to the fiber adapter 4 also has a single core. Alternatively, the fiber adapter 4 may have a plurality of cores, in other words, each fiber adapter 4 allows a plurality of optical fibers to pass through. For example, as shown in FIG. 9, a fiber adapter 4 disposed on a light inlet 11 has dual cores, in other words, each fiber adapter 4 allows two optical fibers to pass through; and correspondingly, an optical fiber connector connected to the fiber adapter 4 also has dual cores.

In an embodiment, referring to FIG. 4, a fastconnect product may be used as a fiber adapter 4. The fiber adapter 4 has a first end 41 and a second end that are disposed opposite to each other. The first end 41 is located outside the enclosure 1, and the second end is located inside the enclosure 1. An external optical fiber connector is installed on the first end 41, and the first end 41 is detachably fastened and connected to the external optical fiber connector. An internal optical fiber connector is installed on the second end, and the second end is detachably fastened and connected to the internal optical fiber connector. A fiber adapter 4 is sealed up on a light inlet 11 on which the fiber adapter 4 is installed, and a fiber adapter 4 is sealed up on a light outlet 12 on which the fiber adapter 4 is installed. In addition, a sealing cap is further disposed on the first end 41 that is of the fiber adapter 4 and that is located outside the enclosure 1. When no external optical fiber connector is installed on the first end 41, the sealing cap is installed on the first end 41 to seal up the fiber adapter. When an optical fiber connector is installed on the first end 41, the first end 41 may also implement sealing.

In an embodiment, referring to FIG. 2, FIG. 3, FIG. 5 to FIG. 9, and FIG. 11, an even optical splitter 2 and an uneven optical splitter 3 are disposed in the enclosure 1.

At least one even optical splitter 2 is disposed in the enclosure 1, and at least one uneven optical splitter 3 is disposed in the enclosure 1. The light inlet 11, the even optical splitter 2, the uneven optical splitter 3, and the light outlets 12 are connected, so that optical paths are formed between the light inlet 11 and the light outlets 12 by using the even optical splitter 2 and the uneven optical splitter 3.

There is at least one even optical splitter 2. For example, there may be one, two, three, or more even optical splitters 2. There is at least one uneven optical splitter 3. For example, there may be one, two, three, or more uneven optical splitters 3.

Figure 10:
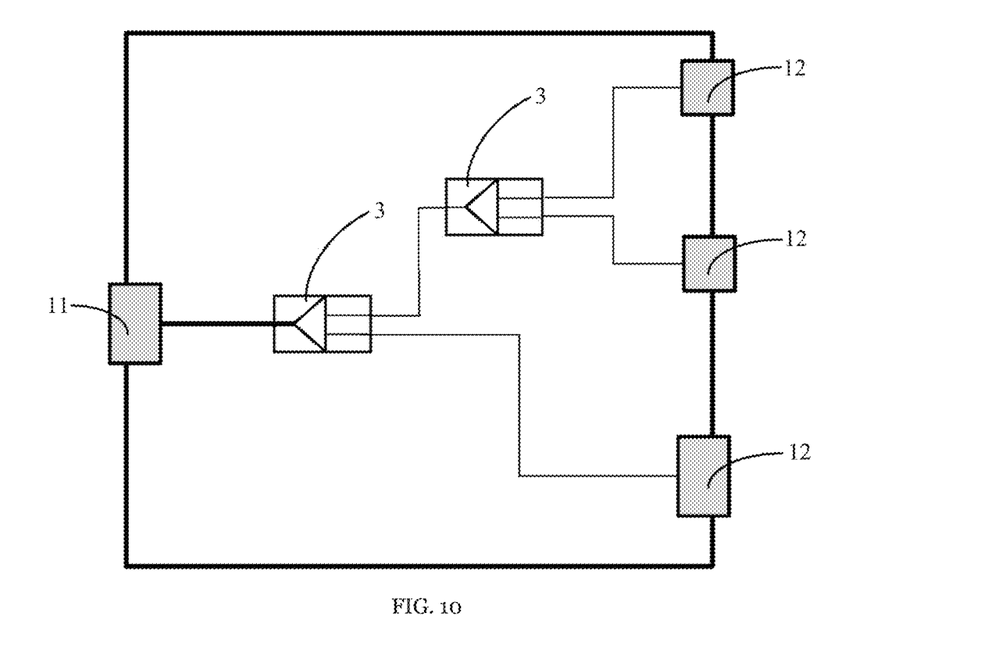
FIG. 10 is a schematic structural diagram of another embodiment of an optical splitting apparatus according to the embodiments of the present invention.

In another embodiment, as shown in FIG. 10, the optical splitting apparatus may include no even optical splitter 2, and the optical splitting apparatus includes an enclosure 1 and an uneven optical splitter 2 that is disposed in the enclosure 1. The light inlet 11, the uneven optical splitter 3, and the light outlets 12 are connected, so that optical paths are formed between the light inlet 11 and the light outlets 12 by using the uneven optical splitter 3. There is at least one uneven optical splitter 3. For example, there may be one, two, three, or more uneven optical splitters 3. A plurality of channels of optical signals with different output optical power can be obtained by using an uneven optical splitter 3 or by cascading a plurality of uneven optical splitters 3. The optical signals are separately transmitted to other nodes through the light outlets 12. A magnitude of optical power of each channel of optical signal is properly allocated based on a quantity of users covered by each node. In this way, the optical signals can cover a longer distance, the optical signals can be properly allocated based on diverse quantities of users without waste of resources, and the optical signals can be properly used at maximum utilization.

In an embodiment, the light inlet 11 is connected to at least one of a light input end of the even optical splitter 2 and a light input end of the uneven optical splitter 3, and the fiber adapter 4 on the light outlet 12 is connected to at least one of a light output end of the even optical splitter 2 and a light output end of the uneven optical splitter 3.

In an embodiment, referring to FIG. 3, FIG. 5, FIG. 7, FIG. 8, and FIG. 9, at least one even optical splitter 2 is connected between the light output end of the uneven optical splitter 3 and the light outlets 12.

As shown in FIG. 3, the uneven optical splitter 3 is, for example, a 1:2 uneven optical splitter. To be specific, the uneven optical splitter 3 includes one light input end 31 and two light output ends (32 and 33), where the two light output ends (32 and 33) have different output optical power. The even optical splitter 2 is, for example, a 1:8 even optical splitter. To be specific, the even optical splitter 2 includes one light input end 21 and eight light output ends 22, where the eight light output ends 22 have same output optical power. The light input end 21 of the even optical splitter 2 is connected to one light output end 33 of the uneven optical splitter 3 (for example, may be connected to the light output end 33 that has relatively low output optical power and that is of the uneven optical splitter 3), and the eight light output ends 22 of the even optical splitter 2 are connected to eight light outlets 122 in a one-to-one correspondence. It can be understood that FIG. 3 shows only a connection between one light output end 22 and one light outlet 122, and connection relationships between the other seven light output ends 22 and the other seven light outlets 122 are omitted in the figure. A specification of the 1:2 uneven optical splitter 3 may be, for example, 90/10, 85/15, 80/20, 70/30, or 60/40, and is specifically selected based on an actual user distribution status. It can be understood that 90/10 means that a ratio of the output optical power of the two light output ends of the uneven optical splitter 3 is 90:10.

In an embodiment, an optical fiber connector may be disposed on each of a light input end and a light output end of an optical splitter (including the even optical splitter 2 and the uneven optical splitter 3). In an embodiment, the optical fiber connector may be detachably fastened and connected to the foregoing fiber adapter 4 (which may be the fiber adapter 4 on the light inlet or may be the fiber adapter 4 on the light outlet), to further improve installation efficiency. During connection of optical fiber connectors of two optical splitters, the optical fiber connectors of the two optical splitters may be detachably fastened and connected by using a fiber adapter disposed in the enclosure 1.

Alternatively, when two optical splitters need to be connected, the two optical splitters may be connected by splicing optical fibers. For example, a segment of optical fiber is disposed on the light input end of the even optical splitter 2, a segment of optical fiber is disposed on one light output end of the uneven optical splitter 3, and the two segments of optical fibers may be directly spliced.

In an embodiment, as shown in FIG. 3, FIG. 5, FIG. 6, FIG. 7, FIG. 8, FIG. 9, and FIG. 11, all light output ends of the at least one even optical splitter 2 are connected to the light outlets 12 in a one-to-one correspondence.

In another embodiment, some light output ends of the even optical splitter 2 are connected to light outlets 12 in a one-to-one correspondence, and other light output ends are connected to light input ends of other even optical splitters 2 or uneven optical splitters 3.

Referring to FIG. 3, the light outlets 12 include one first light outlet 121 and at least two second light outlets 122, and the fiber adapter 4 is disposed on each of the first light outlet 121 and the second light outlets 122. It can be understood that in addition to the first light outlet 121 and the second light outlets 122, the light outlets 12 disposed on the enclosure 1 may further include other light outlets. Fiber adapters 4 on the other light outlets may be configured to allow an optical signal to pass through or may be reserved and idle. This is specifically determined based on an actual requirement.

The uneven optical splitter 3 includes a first light input end 31, a first light output end 32, and a second light output end 33. In this embodiment, the uneven optical splitter 3 may include at least two light output ends. For example, the uneven optical splitter 3 may include two, three, four, or more light output ends. The following uses an example in which the uneven optical splitter 3 includes two light output ends (namely, the first light output end 32 and the second light output end 33).

The even optical splitter 2 includes a second light input end 21 and at least two third light output ends 22, and a quantity of the third light output ends 22 is the same as a quantity of the second light outlets 122. In this embodiment, the even optical splitter 2 may include at least two light output ends. For example, the even optical splitter 2 may be a 1:2, 1:4, 1:8, or 1:16 optical splitter. The following uses an example in which the even optical splitter 2 is a 1:8 optical splitter for description. To be specific, the even optical splitter 2 includes eight third light output ends 22.

The light inlet 11 is connected to the first light input end 31. For example, an optical fiber connector is disposed on the first light input end 31 and is detachably fastened and connected to the fiber adapter 4 on the light inlet 11, thereby further improving installation efficiency. It can be understood that being detachably fastened and connected means that the optical fiber connector may be fastened and connected to the fiber adapter 4, and may also be disassembled from the fiber adapter 4. It is easy to implement insertion and removal, so that installation efficiency is improved.

The first light output end 32 is connected to the fiber adapter 4 on the first light outlet 121. For example, an optical fiber connector is disposed on the first light output end 31 and is detachably fastened and connected to the fiber adapter 4 on the first light outlet 121, thereby further improving installation efficiency.

The second light output end 33 is connected to the second light input end 21. For example, an optical fiber connector is disposed on the second light output end 33, an optical fiber connector is disposed on the second light input end 21, and the enclosure 1 further includes a fiber adapter 4 that is used to detachably fasten and connect the optical fiber connector on the second light output end 33 to the optical fiber connector on the second light input end 21. Both the optical fiber connector on the second light output end 33 and the optical fiber connector on the second light input end 21 are connected to the fiber adapter 4, thereby further improving installation efficiency. Alternatively, for another example, an optical fiber is disposed on the second light output end 33, an optical fiber is disposed on the second light input end 21, and the optical fiber on the second light output end 33 and the optical fiber on the second light input end 21 are spliced.

The third light output ends 22 are connected to the fiber adapters 4 on the second light outlets 122 in a one-to-one correspondence. As shown in FIG. 3, eight third light output ends 22 and eight second light outlets 122 are included, and each third light output end 22 is correspondingly connected to one second light outlet 122. Optical fiber connectors are disposed on the third light output ends 22 and are detachably fastened and connected to the fiber adapters 4 on the second light outlets 122, thereby further improving installation efficiency. It can be understood that FIG. 3 illustrates only one third light output end 22 and one second light outlet 122, and the other third light output ends 22 and the other second light outlets 122 are omitted in FIG. 3.

In an embodiment, output optical power of the first light output end 32 is greater than output optical power of the second light output end 33. In this way, after an optical signal passes through the uneven optical splitter 3, an optical signal of most power is transmitted to a next node through the first light outlet 121, so that the optical signal of most power remains in a trunk path and can be transmitted to a longer distance, and the optical signal is allocated to more users at a longer distance. An optical signal of a small portion of power is allocated to a relatively nearby user for use after passing through the even optical splitter 2.

Figure 5:
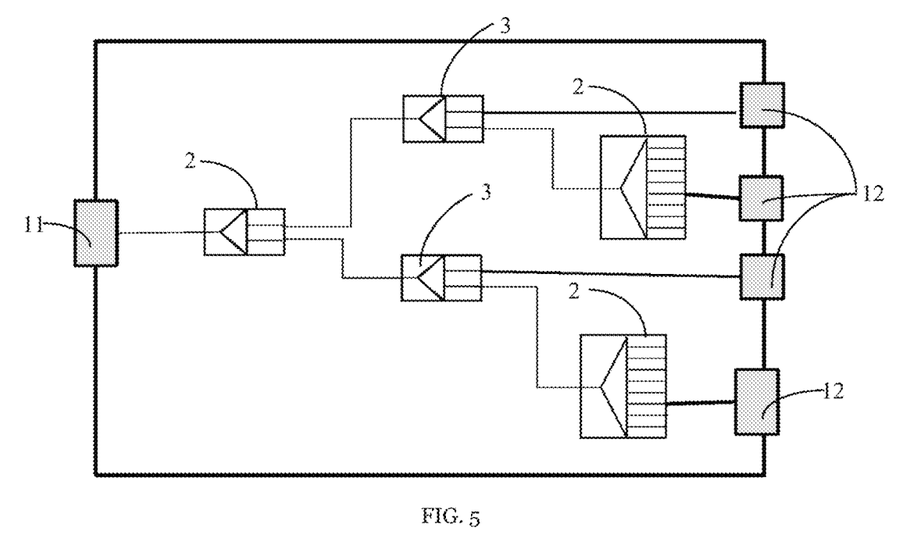
FIG. 5 is a schematic structural diagram of another embodiment of an optical splitting apparatus according to the embodiments of the present invention.
Figure 6:
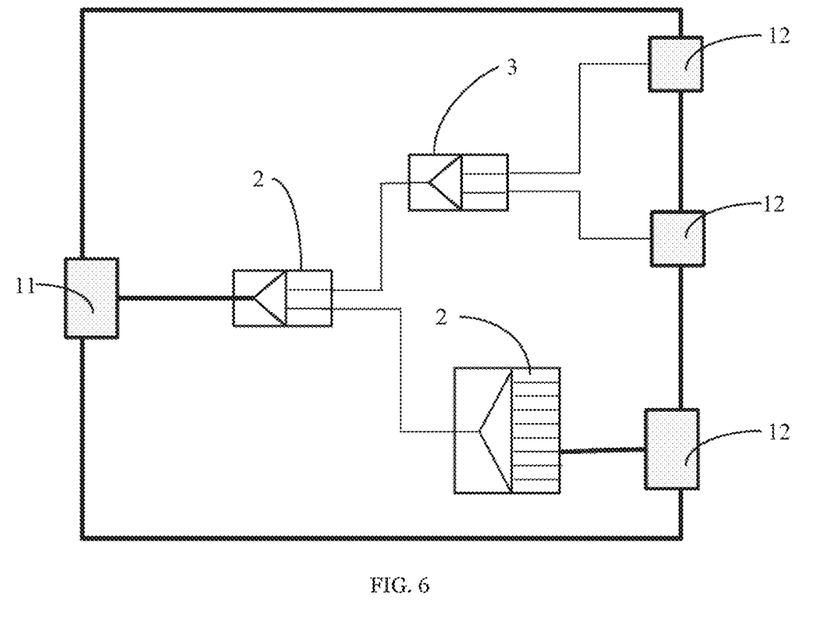
FIG. 6 is a schematic structural diagram of another embodiment of an optical splitting apparatus according to the embodiments of the present invention.
Figure 7:
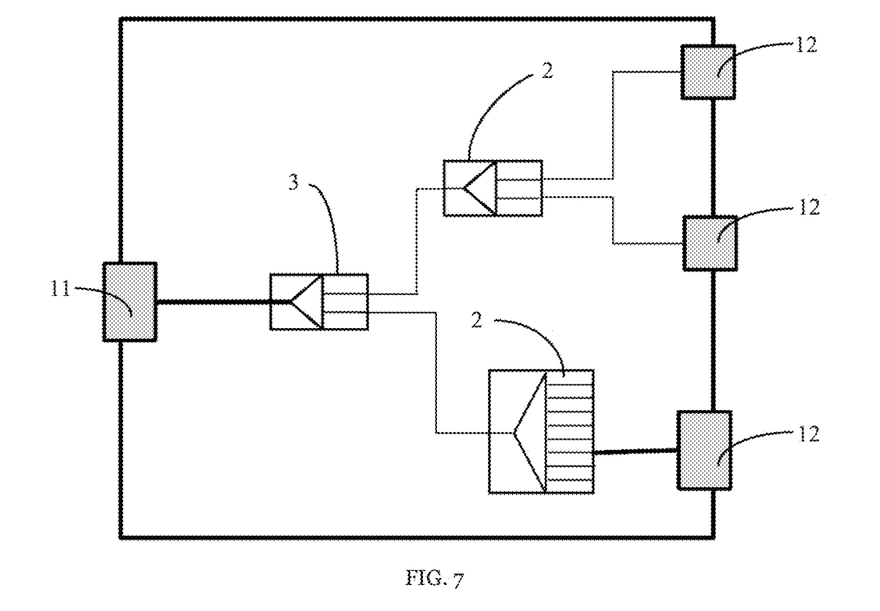
FIG. 7 is a schematic structural diagram of another embodiment of an optical splitting apparatus according to the embodiments of the present invention.
Figure 8:
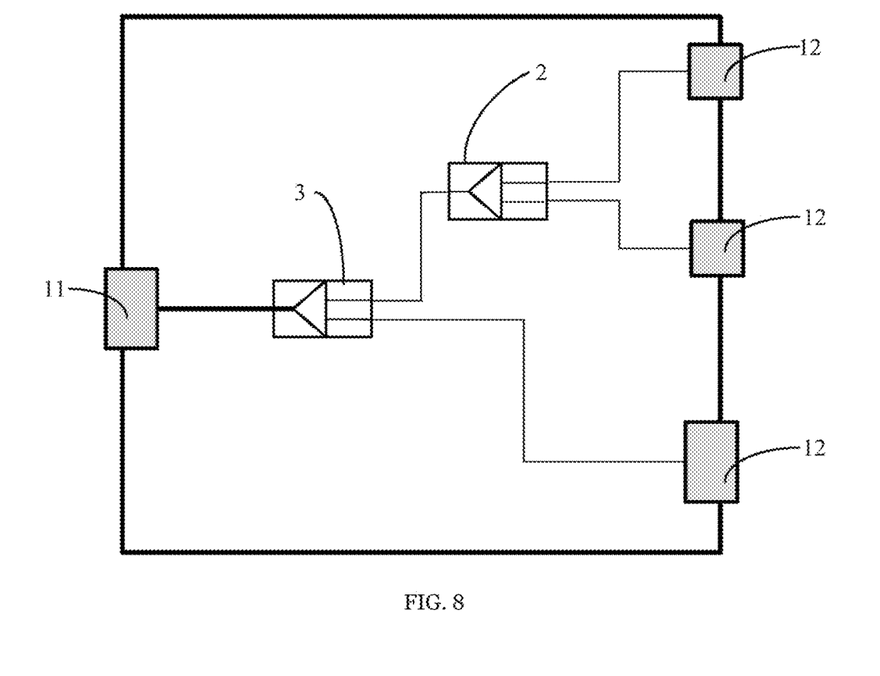
FIG. 8 is a schematic structural diagram of another embodiment of an optical splitting apparatus according to the embodiments of the present invention.
Figure 11:
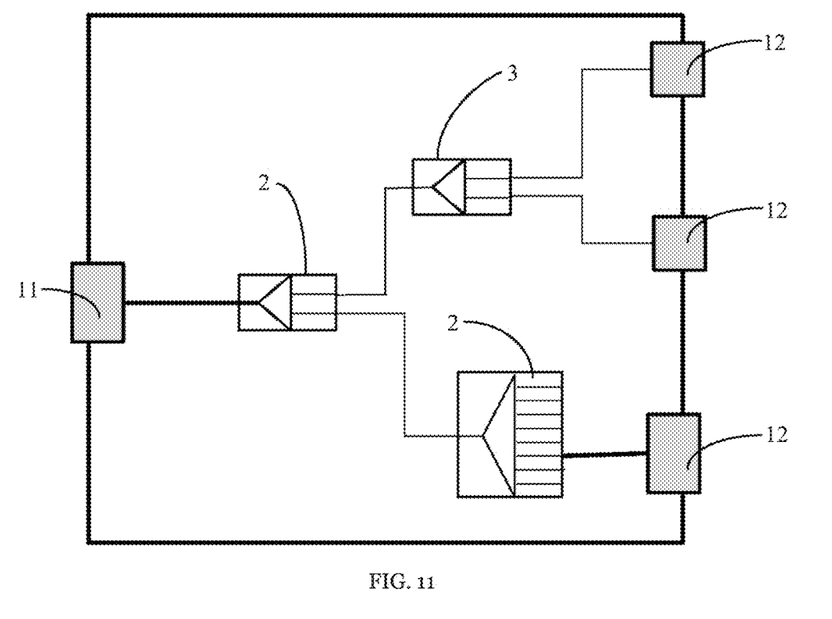
FIG. 11 is a schematic structural diagram of another embodiment of an optical splitting apparatus according to the embodiments of the present invention.

In another embodiment, as shown in FIG. 5, FIG. 6, and FIG. 11, at least one even optical splitter 2 is connected between the light inlet 11 and the light input end of the uneven optical splitter 3. In this way, an optical signal entering the enclosure 1 is first divided evenly by the even optical splitter 2 and then an optical signal obtained after the even division is divided unevenly by the uneven optical splitter 3. Then some optical signals (for example, an optical signal, having relatively high output optical power and output by the uneven optical splitter 3) continue to be transmitted to a longer distance and allocated to more users for use, and some optical signals (for example, an optical signal, having relatively low output optical power and output by the uneven optical splitter 3) are allocated to users nearby to meet use requirements of a relatively large quantity of users nearby. For a specific connection manner, refer to the foregoing embodiments. Details are not described herein again.

In another embodiment, as shown in FIG. 2, FIG. 3, FIG. 5, FIG. 6, FIG. 8, FIG. 9, FIG. 10, and FIG. 11, at least one light outlet 12 is connected to a light output end of at least one uneven optical splitter 3. In this way, an optical signal output by the uneven optical splitter 3 can be transmitted to a longer distance and therefore be allocated to more users at a longer distance.

For example, some light output ends of the at least one uneven optical splitter 3 are connected to the light outlets 12, and the light output ends of the uneven optical splitter 3 that are connected to the light outlets 12 are light output ends having relatively high output optical power in light output ends of the uneven optical splitter 3. In this way, after an optical signal passes through the uneven optical splitter 3, an optical signal of most power is transmitted to a next node through the light outlet 12, so that the optical signal of most power remains in a trunk path and can be transmitted to a longer distance, and the optical signal is allocated to more users at a longer distance. An optical signal of a small portion of power is allocated to a relatively nearby user for use after passing through the even optical splitter 2.

Alternatively, for another example, as shown in FIG. 6, FIG. 10, and FIG. ii, all light output ends of the at least one uneven optical splitter 3 are connected to light outlets 12 in a one-to-one correspondence. In this way, optical signals are transmitted to different nodes after passing through the light output ends of the uneven optical splitter 3. An optical signal output by a light output end having relatively high output optical power may be transmitted to a node covering a relatively large quantity of users, and an optical signal output by a light output end having relatively low output optical power may be transmitted to a node covering a relatively small quantity of users.

In another embodiment, as shown in FIG. 5, FIG. 6, and FIG. 11, at least one uneven optical splitter 3 is connected between the light output end of the even optical splitter 2 and the light outlets 12. In this way, an optical signal entering the enclosure 1 is divided evenly by the even optical splitter 2 and then an optical signal obtained after the even division is divided unevenly by the uneven optical splitter 3. Then some optical signals (for example, an optical signal, having relatively high output optical power and output by the uneven optical splitter 3) continue to be transmitted to a longer distance and allocated to more users for use, and some optical signals (for example, an optical signal, having relatively low output optical power and output by the uneven optical splitter 3) are allocated to users nearby to meet use requirements of a relatively large quantity of users nearby. For a specific connection manner, refer to the foregoing embodiments. Details are not described herein again.

In another embodiment, as shown in FIG. 3, FIG. 7, FIG. 8, and FIG. 9, at least one uneven optical splitter 3 is connected between the light inlet 11 and the light input end of the even optical splitter 2. In this way, an optical signal entering the enclosure 1 is divided unevenly by the uneven optical splitter 3 and then an optical signal obtained after the uneven division is divided evenly by the even optical splitter 2 (for example, the even optical splitter 2 may be connected to a light output end, of the uneven optical splitter 3, having relatively low output optical power), to meet a use requirement of a user nearby. A light output end, of the even optical splitter 2, having relatively high output optical power may be connected to a light outlet 12, so that an optical signal continues to be transmitted to a longer distance and allocated to more users for use.

In another embodiment, as shown in FIG. 9, the fiber adapter 4 on the light inlet 11 has dual cores.

In addition, in other embodiments, embodiments of the optical splitting apparatus are shown in FIG. 10 and FIG. 11.

In the embodiments of the present invention, the even optical splitter 2 and the uneven optical splitter 3 are combined, and optical paths are formed between the light inlet 11, the even optical splitter 2, the uneven optical splitter 3, and the light outlets 12. Because user distribution is diversified, that is, user distribution density, a user distribution area, and the like vary with a region, quantities of light inlets 11, even optical splitters 2, uneven optical splitters 3, and light outlets 12 and cascading manners thereof may all be set flexibly based on an actual requirement, to meet an optical fiber requirement corresponding to actual user distribution.

Fiber adapters 4 are disposed on the light inlet 11 and the light outlets 12, and a fastconnect product may be used as a fiber adapter 4. During installation, installation can be completed by directly inserting an optical fiber connector on a pre-made optical cable into a fiber adapter 4. In this way, an optical splitting box is installed without splicing, and plug-and-play is implemented for all components, thereby effectively lowering an implementation difficulty, and improving implementation efficiency.

The pre-made optical cable includes an optical fiber connector on each end when being delivered from a factory, and therefore a length of the pre-made optical cable is fixed and cannot be changed after the delivery. User distribution is diversified. Therefore, if only the even optical splitter 2 is used in the optical splitting box, a coverage area of an optical fiber is very small. The fiber adapter 4, the uneven optical splitter 3, and the even optical splitter 2 are combined, so that the optical splitting box is installed by using the pre-made optical cable without splicing, and plug-and-play is implemented for all the components. In addition, output optical power of each light outlet 12 can be configured flexibly based on a user distribution status. For example, a light outlet having relatively low output optical power may correspondingly cover a relatively nearby user, and an optical cable coming out of a light outlet having relatively high output optical power may be further connected to a next node, to cover more users at a longer distance.

It can be understood that a connection manner between the light inlet, the even optical splitter, the uneven optical splitter, and the light outlets of the optical splitting apparatus is not limited to the foregoing combination manners shown in the figures. Any implementation in which the optical splitting apparatus includes an uneven optical splitter and optical paths are formed between the light inlet and the light outlets by using the uneven optical splitter shall fall within the protection scope of this application.

The optical splitting apparatus in this application may be an optical splitting box or may be a component of an optical splitting box. In addition, the optical splitting apparatus can be directly connected to an optical splitting box, or may be connected to an optical splitting box by using another adapter component. This is not specifically limited in this application.

It can be understood that names such as the light inlet 11, the light outlet 12, and a light input end and a light output end of an optical splitter (including the even optical splitter and the uneven optical splitter) are all defined based on an optical transmission direction of transmitting a downlink optical signal. It can be understood that during transmission of an uplink optical signal, the light inlet 11 is also used to output light, the light outlet 12 is also used to input light, the light input end is also used to output light, and the light output end is also used to input light. Therefore, the light inlet 11, the light outlet 12, the light input end and the light output end of the optical splitter (including the even optical splitter and the uneven optical splitter), and the like are merely definitions of names intended for distinguishing between structures for reading, and are not intended for limiting a function (for example, light input or light output).

In the foregoing embodiments, the description of each embodiment has respective focuses. For a part that is not described in detail in an embodiment, refer to related descriptions in other embodiments.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

The technical solutions provided in this application are described in detail above. The principles and implementations of this application are described in this application through specific examples. The description of the embodiments is merely provided to help understand the method and core ideas of this application. In addition, a person of ordinary skill in the art can make variations and modifications in terms of the specific implementations and application scopes according to the ideas of this application. Therefore, the content of the specification shall not be construed as a limitation to this application.

What is claimed is:

1. An optical splitting apparatus comprising:
   an enclosure;
   a first even optical splitter disposed in the enclosure, the first even optical splitter configured to split an optical signal into optical signals of same optical powers, and having a first light output end and a second light output end;
   a first uneven optical splitter and a second uneven optical splitter disposed in the enclosure, the first uneven optical splitter and the second uneven optical splitter each configured to split a received optical signal into optical signals of different optical powers, and each having a light input end;
   a light inlet disposed on the enclosure; and
   a plurality of light outlets disposed on the enclosure, with fiber adapters disposed on the plurality of light outlets; and
   wherein the first light output end and the second light output end of the first even optical splitter are connected to the respective light input ends of the first uneven optical splitter and the second uneven optical splitter;
   wherein the light inlet, the first even optical splitter and the plurality of light outlets are connected through the first uneven optical splitter and the second uneven optical splitter, so that optical paths are formed between the light inlet and the plurality of light outlets; and
   wherein the light inlet is connected to a light input end of the first even optical splitter, and the plurality of light outlets is connected to light output ends of the first uneven optical splitter and the second uneven optical splitter; and
   wherein a first set of light output ends of the first uneven optical splitter are connected to the plurality of light outlets, and the first set of the light output ends has a higher output optical power than a second set of the light output ends of the first uneven optical splitter, wherein each light output end of the first set has a higher output optical power than each light output end of the second set.

2. The optical splitting apparatus according to claim 1, further comprising a fiber adapter disposed on the light inlet.

3. The optical splitting apparatus according to claim 1, wherein a first fiber adapter on a light outlet of the plurality of light outlets comprises an end that is located outside the enclosure and is detachably fastened and connected to an external optical fiber connector.

4. The optical splitting apparatus according to claim 1, wherein a first fiber adapter on a light outlet of the plurality of light outlets comprises an end that is located inside the enclosure and is detachably fastened and connected to an internal optical fiber connector.

5. The optical splitting apparatus according to claim 1, further comprising a second even optical splitter connected between a light output end of the first uneven optical splitter and the plurality of light outlets, the second even optical splitter configured to split an optical signal into optical signals of a same optical power.

6. The optical splitting apparatus according to claim 5, wherein all light output ends of the second even optical splitter are connected to the plurality of light outlets in a one-to-one correspondence.

7. The optical splitting apparatus according to claim 5, wherein the plurality of light outlets comprise a first light outlet and at least two second light outlets, and a fiber adapter is disposed on each of the first light outlet and the at least two second light outlets;
   the first uneven optical splitter comprises a first light output end, and a second light output end;
   the second even optical splitter comprises a second light input end and at least two third light output ends, and a quantity of the at least two third light output ends is the same as a quantity of the at least two second light outlets;
   the first light output end of the first uneven optical splitter is connected to the fiber adapter disposed on the first light outlet; and
   the second light output end of the first uneven optical splitter is connected to the second light input end of the second even optical splitter, and the at least two third light output ends of the second even optical splitter are connected to fiber adapters disposed on the at least two second light outlets in a one-to-one correspondence.

8. The optical splitting apparatus according to claim 7, further comprising:
   a first optical fiber connector that is disposed on a first light input end of the first even optical splitter and is detachably fastened and connected to a fiber adapter on the light inlet;
   a second optical fiber connector that is disposed on the first light output end of the first uneven optical splitter and is detachably fastened and connected to the fiber adapter on the first light outlet; and
   a third optical fiber connector that is disposed on one of the at least two third light output ends of the second even optical splitter and is detachably fastened and connected to the fiber adapter on one of the at least two second light outlets.

9. The optical splitting apparatus according to claim 7, further comprising:
   a first optical fiber connector that is disposed on the second light output end of the second uneven optical splitter;
   a second optical fiber connector that is disposed on the second light input end of the second even optical splitter; and
   wherein the enclosure further comprises a second fiber adapter that is configured to detachably fasten and connect the first optical fiber connector on the second light output end of the second uneven optical splitter to the second optical fiber connector on the second light input end of the second even optical splitter; or a first optical fiber is disposed on the second light output end of the first uneven optical splitter, a second optical fiber is disposed on the second light input end of the second even optical splitter, and the first optical fiber on the second light output end of the first uneven optical splitter and the second optical fiber on the second light input end of the second even optical splitter are spliced.

10. The optical splitting apparatus according to claim 7, further comprising:
a first optical fiber disposed on the second light output end of the second uneven optical splitter; and
a second optical fiber disposed on the second light input end of the second even optical splitter, wherein the first optical fiber on the second light output end of the second uneven optical splitter and the second optical fiber on the second light input end of the second even optical splitter are spliced.

11. The optical splitting apparatus according to claim 7, wherein an output optical power of the first light output end of the first uneven optical splitter is greater than an output optical power of the second light output end of the first uneven optical splitter.

12. The optical splitting apparatus according to claim 1, further comprising at least one even optical splitter that is connected between each of the first uneven optical splitter and the second uneven optical splitter and the plurality of light outlets, the even optical splitter configured to split an optical signal into optical signals of a same optical power.

13. The optical splitting apparatus according to claim 1, wherein all light output ends of the first uneven optical splitter and the second uneven optical splitter are connected to the plurality of light outlets in a one-to-one correspondence.

14. The optical splitting apparatus according to claim 1, further comprising a third even optical splitter configured to split an optical signal into optical signals of a same optical power, wherein the third even optical splitter is connected between a light output end of the first uneven optical splitter and the plurality of light outlets.

15. The optical splitting apparatus according to claim 1, further comprising a third uneven optical splitter configured to split an optical signal into optical signals of different optical powers, wherein the third uneven optical splitter is connected between the light inlet and a light input end of the first even optical splitter.

16. An optical splitting apparatus comprising:
an enclosure;
a first even optical splitter disposed in the enclosure, the first even optical splitter configured to split an optical signal into optical signals of same optical powers, and having a first light output end and a second light output end;
an uneven optical splitter disposed in the enclosure, the uneven optical splitter configured to split an optical signal into optical signals of different optical powers, and having a first light input end;
a second even optical splitter disposed in the enclosure, the second even optical splitter configured to split an optical signal into optical signals of same optical powers, and having a second light input end;
a light inlet disposed on the enclosure; and
a plurality of light outlets disposed on the enclosure, with fiber adapters disposed on the plurality of light outlets; and
wherein the first light output end and the second light output end of the first even optical splitter are connected, respectively, to the first light input end of the uneven optical splitter and the second light input end of the second even optical splitter;
wherein the light inlet, the first even optical splitter, and the plurality of light outlets are connected through the uneven optical splitter and the second even optical splitter, so that optical paths are formed between the light inlet and the plurality of light outlets; and
wherein the light inlet is connected to a light input end of the first even optical splitter, and the plurality of light outlets is connected to light output ends of the second even optical splitter and light output ends of the uneven optical splitter.

17. The optical splitting apparatus according to claim 16, further comprising a fiber adapter disposed on the light inlet.

18. The optical splitting apparatus according to claim 16, wherein a first fiber adapter on a light outlet of the plurality of light outlets comprises a first end that is located outside the enclosure and is detachably fastened and connected to an external optical fiber connector, and a second end that is located inside the enclosure and is detachably fastened and connected to an internal optical fiber connector.

19. The optical splitting apparatus according to claim 16, further comprising a third even optical splitter connected between the uneven optical splitter and the plurality of light outlets.

* * * * *